United States Patent
Ernst et al.

(10) Patent No.: US 8,776,517 B2
(45) Date of Patent: *Jul. 15, 2014

(54) EMISSIONS-CRITICAL CHARGE COOLING USING AN ORGANIC RANKINE CYCLE

(75) Inventors: Timothy C. Ernst, Columbus, IN (US); Christopher R. Nelson, Columbus, IN (US)

(73) Assignee: Cummins Intellectual Properties, Inc., Minneapolis, MN (US)

( * ) Notice: Subject to any disclaimer, the term of this patent is extended or adjusted under 35 U.S.C. 154(b) by 403 days.

This patent is subject to a terminal disclaimer.

(21) Appl. No.: 13/204,568

(22) Filed: Aug. 5, 2011

(65) Prior Publication Data

US 2012/0023946 A1 Feb. 2, 2012

Related U.S. Application Data (63) Continuation-in-part of application No. 12/058,810, filed on Mar. 31, 2008, now Pat. No. 7,997,076.

(60) Provisional application No. 61/371,162, filed on Aug. 5, 2010.

(51) Int. Cl.

| | | |
|---|---|---|
| F02G 3/00 | (2006.01) | |
| F02G 1/00 | (2006.01) | |
| F01K 13/00 | (2006.01) | |
| F01K 7/34 | (2006.01) | |
| F01K 9/00 | (2006.01) | |
| F01K 17/00 | (2006.01) | |
| F02C 1/00 | (2006.01) | |
| F02M 25/07 | (2006.01) | |
| F02G 5/02 | (2006.01) | |
| F01K 23/08 | (2006.01) | |
| F01K 23/06 | (2006.01) | |
| F01K 23/10 | (2006.01) | |
| F02C 3/34 | (2006.01) | |
| F02C 1/06 | (2006.01) | |
| F02C 1/08 | (2006.01) | |

(52) U.S. Cl.
CPC ............ *F02G 5/02* (2013.01); *F02M 25/0707* (2013.01); *F01K 23/08* (2013.01); *F01K 23/068* (2013.01); *F01K 23/10* (2013.01); *F01K 23/106* (2013.01); *F02C 3/34* (2013.01); *F02C 1/06* (2013.01); *F02C 1/08* (2013.01)
USPC ................ 60/616; 60/605.2; 60/645; 60/653; 60/661; 60/677; 60/39.182; 60/39.52

(58) Field of Classification Search
CPC ...... F02G 5/02; F02M 25/0707; F01K 25/08; F01K 23/068; F01K 23/10; F01K 23/106; F01K 11/00; F01K 23/04; F01K 9/003; F02C 3/34; F02C 1/06; F02C 1/08; Y02E 20/16
USPC ................ 60/616, 605.2, 670–671, 677, 645, 60/648.1, 651, 653, 772, 661, 39.12, 60/39.52, 39.182
See application file for complete search history.

(56) References Cited

U.S. PATENT DOCUMENTS

| | | |
|---|---|---|
| 3,232,052 A | 2/1966 | Ricard |
| 3,789,804 A | 2/1974 | Aguet |
| 4,009,587 A | 3/1977 | Robinson, Jr. et al. |
| 4,164,850 A | 8/1979 | Lowi, Jr. |
| 4,204,401 A | 5/1980 | Earnest |
| 4,232,522 A | 11/1980 | Steiger |
| 4,267,692 A | 5/1981 | Earnest |
| 4,271,664 A | 6/1981 | Earnest |
| 4,428,190 A | 1/1984 | Bronicki |
| 4,458,493 A | 7/1984 | Amir et al. |
| 4,581,897 A | 4/1986 | Sankrithi |
| 4,630,572 A | 12/1986 | Evans |
| 4,831,817 A | 5/1989 | Linhardt |
| 4,873,829 A | 10/1989 | Williamson |
| 4,911,110 A | 3/1990 | Isoda et al. |
| 5,121,607 A | 6/1992 | George, Jr. |
| 5,207,188 A | 5/1993 | Hama et al. |
| 5,421,157 A | 6/1995 | Rosenblatt |
| 5,649,513 A | 7/1997 | Kanda |
| 5,685,152 A | 11/1997 | Sterling |
| 5,771,868 A | 6/1998 | Khair |
| 5,806,322 A | 9/1998 | Cakmakci et al. |
| 5,915,472 A | 6/1999 | Takikawa et al. |

| | | |
|---|---|---|
| 5,950,425 A | 9/1999 | Takahashi et al. |
| 6,014,856 A | 1/2000 | Bronicki et al. |
| 6,035,643 A | 3/2000 | Rosenblatt |
| 6,055,959 A | 5/2000 | Taue |
| 6,138,649 A | 10/2000 | Khair et al. |
| 6,301,890 B1 | 10/2001 | Zeretzke |
| 6,321,697 B1 | 11/2001 | Matsuda et al. |
| 6,324,849 B1 | 12/2001 | Togawa et al. |
| 6,393,840 B1 | 5/2002 | Hay |
| 6,494,045 B2 | 12/2002 | Rollins, III |
| 6,523,349 B2 | 2/2003 | Viteri |
| 6,571,548 B1 | 6/2003 | Bronicki et al. |
| 6,598,397 B2 | 7/2003 | Hanna et al. |
| 6,606,848 B1 | 8/2003 | Rollins, III |
| 6,637,207 B2 | 10/2003 | Konezciny et al. |
| 6,701,712 B2 | 3/2004 | Bronicki et al. |
| 6,715,296 B2 | 4/2004 | Bakran et al. |
| 6,745,574 B1 | 6/2004 | Dettmer |
| 6,748,934 B2 | 6/2004 | Natkin et al. |
| 6,751,959 B1 | 6/2004 | McClanahan et al. |
| 6,792,756 B2 | 9/2004 | Bakran et al. |
| 6,810,668 B2 | 11/2004 | Nagatani et al. |
| 6,817,185 B2 | 11/2004 | Coney et al. |
| 6,848,259 B2 | 2/2005 | Kelller-Sornig et al. |
| 6,877,323 B2 | 4/2005 | Dewis |
| 6,880,344 B2 | 4/2005 | Radcliff et al. |
| 6,910,333 B2 | 6/2005 | Minemi et al. |
| 6,964,168 B1 | 11/2005 | Pierson et al. |
| 6,977,983 B2 | 12/2005 | Correia et al. |
| 6,986,251 B2 | 1/2006 | Radcliff et al. |
| 7,007,487 B2 | 3/2006 | Belokon et al. |
| 7,028,463 B2 | 4/2006 | Hammond et al. |
| 7,044,210 B2 | 5/2006 | Usui |
| 7,069,884 B2 | 7/2006 | Baba et al. |
| 7,117,827 B1 | 10/2006 | Hinderks |
| 7,121,906 B2 | 10/2006 | Sundel |
| 7,131,259 B2 | 11/2006 | Rollins, III |
| 7,131,290 B2 | 11/2006 | Taniguchi et al. |
| 7,159,400 B2 | 1/2007 | Tsutsui et al. |
| 7,174,716 B2 | 2/2007 | Brasz et al. |
| 7,174,732 B2 | 2/2007 | Taniguchi et al. |
| 7,191,740 B2 | 3/2007 | Baba et al. |
| 7,200,996 B2 | 4/2007 | Cogswell et al. |
| 7,225,621 B2 | 6/2007 | Zimron et al. |
| 7,281,530 B2 | 10/2007 | Usui |
| 7,290,393 B2 * | 11/2007 | Cogswell et al. ............... 60/651 |
| 7,325,401 B1 | 2/2008 | Kesseli et al. |
| 7,340,897 B2 | 3/2008 | Zimron et al. |
| 7,454,911 B2 | 11/2008 | Tafas |
| 7,469,540 B1 | 12/2008 | Knapton et al. |
| 7,578,139 B2 | 8/2009 | Nishikawa et al. |
| 7,665,304 B2 | 2/2010 | Sundel |
| 7,721,552 B2 | 5/2010 | Hansson et al. |
| 7,735,323 B2 * | 6/2010 | Bennett ..................... 60/641.8 |
| 7,797,940 B2 | 9/2010 | Kaplan |
| 7,823,381 B2 | 11/2010 | Misselhorn |
| 7,833,433 B2 | 11/2010 | Singh et al. |
| 7,866,157 B2 | 1/2011 | Ernst et al. |
| 7,942,001 B2 | 5/2011 | Radcliff et al. |
| 7,958,873 B2 | 6/2011 | Ernst et al. |
| 7,997,076 B2 * | 8/2011 | Ernst .............................. 60/616 |
| 8,186,161 B2 * | 5/2012 | Ast et al. ..................... 60/645 |
| 2002/0099476 A1 | 7/2002 | Hamrin et al. |
| 2003/0033812 A1 | 2/2003 | Gerdes et al. |
| 2003/0213245 A1 | 11/2003 | Yates et al. |
| 2003/0213246 A1 | 11/2003 | Coll et al. |
| 2003/0213248 A1 | 11/2003 | Osborne et al. |
| 2005/0262842 A1 | 12/2005 | Claassen et al. |
| 2008/0289313 A1 | 11/2008 | Batscha et al. |
| 2008/0289334 A1 * | 11/2008 | Orosz et al. ................. 60/641.8 |
| 2009/0031724 A1 | 2/2009 | Ruiz |
| 2009/0090109 A1 | 4/2009 | Mills et al. |
| 2009/0121495 A1 | 5/2009 | Mills |
| 2009/0133646 A1 | 5/2009 | Wankhede et al. |
| 2009/0151356 A1 | 6/2009 | Ast et al. |
| 2009/0179429 A1 | 7/2009 | Ellis et al. |
| 2009/0211253 A1 | 8/2009 | Radcliff et al. |
| 2009/0241543 A1 | 10/2009 | Ernst |
| 2009/0320477 A1 | 12/2009 | Juchymenko |
| 2009/0322089 A1 | 12/2009 | Mills et al. |
| 2010/0018207 A1 | 1/2010 | Juchymenko |
| 2010/0071368 A1 | 3/2010 | Kaplan et al. |
| 2010/0083919 A1 | 4/2010 | Bucknell |
| 2010/0139626 A1 | 6/2010 | Raab et al. |
| 2010/0180584 A1 | 7/2010 | Berger et al. |
| 2010/0192569 A1 | 8/2010 | Ambros et al. |
| 2010/0229525 A1 | 9/2010 | Mackay et al. |
| 2010/0257858 A1 | 10/2010 | Yaguchi et al. |
| 2010/0263380 A1 | 10/2010 | Biederman et al. |
| 2010/0282221 A1 | 11/2010 | Le Lievre |
| 2010/0287934 A1 * | 11/2010 | Glynn et al. ..................... 60/645 |
| 2010/0288571 A1 | 11/2010 | Dewis et al. |
| 2011/0005477 A1 | 1/2011 | Terashima et al. |
| 2011/0006523 A1 | 1/2011 | Samuel |
| 2011/0094485 A1 | 4/2011 | Vuk et al. |
| 2011/0209473 A1 | 9/2011 | Fritz et al. |
| 2012/0023946 A1 | 2/2012 | Ernst et al. |
| 2012/0036860 A1 * | 2/2012 | Wettstein et al. ............... 60/772 |
| 2012/0192560 A1 * | 8/2012 | Ernst et al. ..................... 60/616 |

FOREIGN PATENT DOCUMENTS

| | | | |
|---|---|---|---|
| EP | 1 273 785 B1 | 5/2007 | |
| JP | 60-222511 A | 11/1985 | |
| JP | 8-68318 A | 3/1996 | |
| JP | 9-32653 A | 2/1997 | |
| JP | 10-238418 A | 9/1998 | |
| JP | 11-166453 A | 6/1999 | |
| JP | 2005-36787 A | 2/2005 | |
| JP | 2005-42618 A | 2/2005 | |
| JP | 2005-201067 A | 7/2005 | |
| JP | 2005-329843 A | 12/2005 | |
| JP | 2008-240613 A | 10/2008 | |
| JP | 2009-167995 A | 7/2009 | |
| JP | 2009-191647 A | 8/2009 | |
| JP | 2010-77964 A | 4/2010 | |
| WO | WO 2006138459 A2 * | 12/2006 | .............. F01K 23/06 |
| WO | 2009/098471 A2 | 8/2009 | |

OTHER PUBLICATIONS

International Search Report and Written Opinion of the International Searching Authority dated Jan. 16, 2012 from corresponding International Application No. PCT/JP2011/046852.

* cited by examiner

*Primary Examiner* — Thai Ba Trieu (74) *Attorney, Agent, or Firm* — Foley & Lardner LLP (57) ABSTRACT

The disclosure provides a system including a Rankine power cycle cooling subsystem providing emissions-critical charge cooling of an input charge flow. The system includes a boiler fluidly coupled to the input charge flow, an energy conversion device fluidly coupled to the boiler, a condenser fluidly coupled to the energy conversion device, a pump fluidly coupled to the condenser and the boiler, an adjuster that adjusts at least one parameter of the Rankine power cycle subsystem to change a temperature of the input charge exiting the boiler, and a sensor adapted to sense a temperature characteristic of the vaporized input charge. The system includes a controller that can determine a target temperature of the input charge sufficient to meet or exceed predetermined target emissions and cause the adjuster to adjust at least one parameter of the Rankine power cycle to achieve the predetermined target emissions.

15 Claims, 4 Drawing Sheets

EMISSIONS-CRITICAL CHARGE COOLING USING AN ORGANIC RANKINE CYCLE

CROSS REFERENCE TO RELATED APPLICATIONS

This application is a Continuation-in-Part (CIP) of U.S. application Ser. No. 12/058,810 filed on Mar. 31, 2008, and claims benefit of priority to Provisional Patent Application No. 61/371,162, filed on Aug. 5, 2010, the entire contents of which are hereby incorporated by reference.

STATEMENT REGARDING FEDERALLY SPONSORED RESEARCH OR DEVELOPMENT

This invention was made with government support under "Exhaust Energy Recovery," contract number DE-FC26-05NT42419 awarded by the Department of Energy (DOE). The government has certain rights in the invention.

FIELD OF THE INVENTION

The invention relates to energy conversion from waste heat, and more particularly, to a waste heat recovery system utilizing a Rankine cycle (RC) system that provides emissions-critical charge cooling.

BACKGROUND

A Rankine cycle (RC), such as an organic Rankine Cycle (ORC) can capture a portion of heat energy that normally would be wasted ("waste heat") and convert a portion of that captured heat energy into energy that can perform useful work. Systems utilizing an RC are sometimes called waste heat recovery (WHR) systems. For example, heat from an internal combustion engine system such as exhaust gas heat energy and other engine heat sources (e.g., engine oil, exhaust gas, charge gas, water jackets) can be captured and converted to useful energy (e.g., electrical or mechanical energy). In this way, a portion of the waste heat energy can be recovered to increase the efficiency of a system including one or more waste heat sources.

SUMMARY

In one aspect of the disclosure, a system includes a Rankine power cycle subsystem providing emissions-critical charge cooling of an input charge flow, which includes at least one of an exhaust gas recirculation (EGR) source and a charge air source, upstream of an intake internal combustion engine. The system includes a boiler fluidly coupled to the input charge flow and adapted to transfer heat from the input charge flow to a working fluid of the Rankine power cycle subsystem and vaporize the working fluid, an energy conversion device fluidly coupled to the boiler and adapted to receive vaporized working fluid and convert the energy of the transferred heat, a condenser fluidly coupled to the energy conversion device and adapted to receive the working fluid from which the energy was converted, a pump having an inlet fluidly coupled to an outlet of the condenser and an outlet fluidly coupled to an inlet of the boiler, said pump adapted to move fluid from the condenser to the boiler, a mechanism for adjusting at least one parameter of the Rankine power cycle subsystem to change a temperature of the input charge flow exiting the boiler, a sensor adapted to sense a temperature characteristic of the input charge flow, and a controller. The controller is adapted to determine a target temperature of the input charge flow that is sufficient to meet or exceed predetermined target emissions and to cause the adjusting mechanism to adjust at least one parameter of the Rankine power cycle to achieve the predetermined target emissions.

In another aspect of the disclosure, an internal combustion engine includes a Rankine power cycle cooling subsystem that provides emissions-critical charge cooling of an input charge flow, which includes at least one of an exhaust gas recirculation (EGR) source and a charge air source, upstream of an intake of the internal combustion engine. The Rankine subsystem includes a boiler fluidly coupled to the input charge flow and adapted to transfer heat from the input charge to a working fluid of the Rankine power cycle subsystem and vaporize the working fluid, an energy conversion device fluidly coupled to the boiler and adapted to receive vaporized working fluid and convert the energy of the transferred heat, a condenser fluidly coupled to the energy conversion device and adapted to receive the working fluid from which the energy was converted, a pump having an inlet fluidly coupled to an outlet of the condenser and an outlet fluidly coupled to an inlet of the boiler, said pump adapted to move fluid from the condenser to the boiler, an adjuster adapted to adjust at least one parameter of the Rankine power cycle subsystem to change a temperature of the input charge flow exiting the boiler, a sensor adapted to sense a temperature characteristic of the input charge flow, and a controller adapted to determine a threshold temperature of the input charge flow, below which is sufficient to meet or exceed a predetermined target emissions and to cause said adjuster to adjust at least one parameter of the Rankine power cycle to maintain the sensed temperature within the determined threshold temperature.

In yet another aspect of the invention, a method of cooling input charge flow, which includes at least one of an exhaust gas recirculation (EGR) source and a charge air source, upstream of an intake internal combustion engine, includes providing the input charge flow to a boiler a Rankine power cycle subsystem to transfer heat from the input charge to a working fluid of the Rankine power cycle subsystem and vaporize the working fluid, converting the energy of the transferred heat, condensing the working fluid from which the energy was converted, pumping the condensed working fluid to move the working fluid though the Rankine power cycle, determining a target temperature of the input charge sufficient to meet or exceed predetermined target emissions, sensing the temperature of the input charge flow exiting the boiler; and controlling at least one parameter of the Rankine power cycle to maintain temperature of the input charge at or below the target temperature.

DETAILED DESCRIPTION

Various aspects are described hereafter in connection with exemplary embodiments. However, the disclosure should not be construed as being limited to these embodiments. Rather, these embodiments are provided so that the disclosure will be thorough and complete, and will fully convey the scope of the invention to those skilled in the art. Descriptions of well-known functions and constructions may not be described for clarity and conciseness. Further, embodiments other than those described herein can include any alterations and further modifications and further applications of the disclosed principles, which would normally occur to one skilled in the art to which the disclosure relates.

Embodiments disclosed herein use an ORC to perform at least a portion of the emissions-critical cooling for charge gases, which can include the fresh charge air and/or EGR gases. In order to meet current emission levels, the charge gases must be cooled to some target temperature value in order to obtain a favorable NOx/particulate matter tradeoff.

Figure 1:
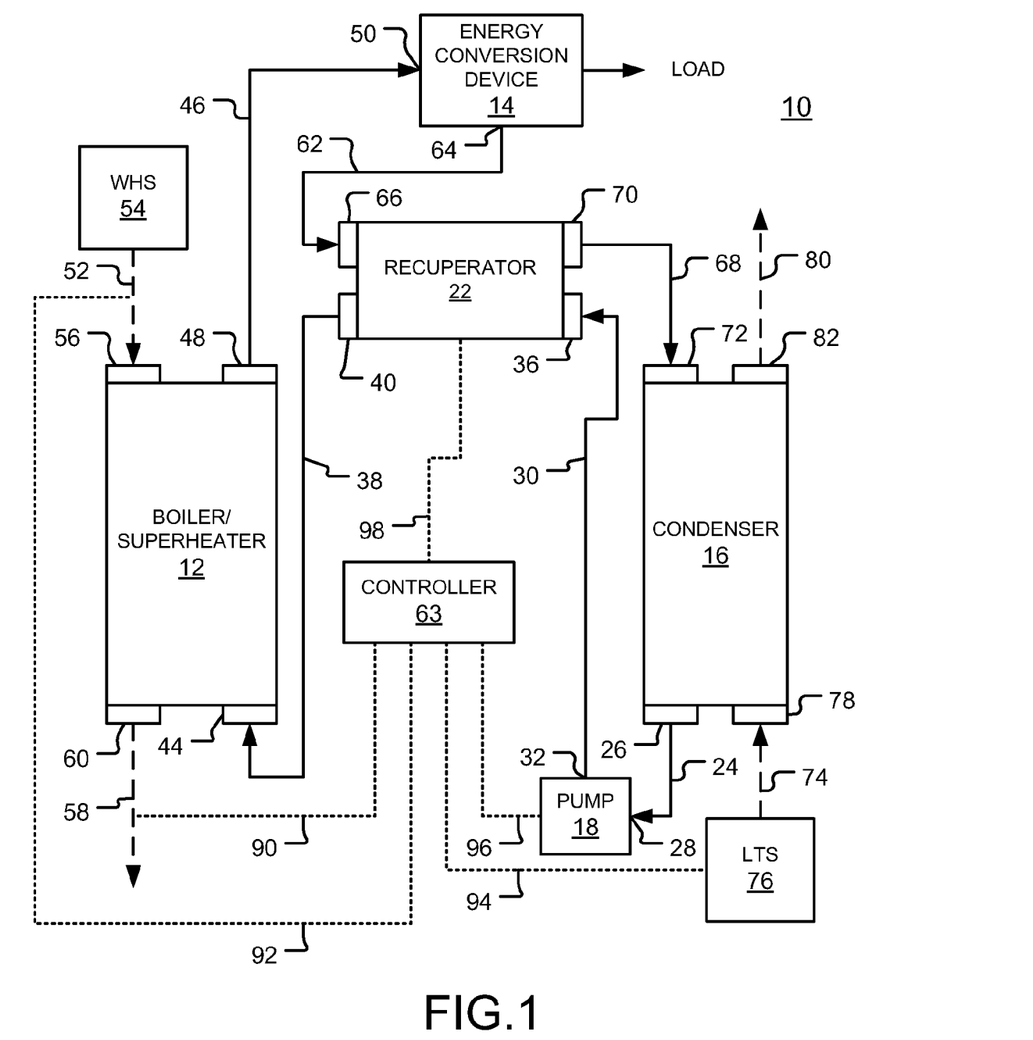
FIG. 1 is a diagram of a generalized waste recovery system including a Rankine cycle according to an exemplary embodiment.

FIG. 1 depicts an exemplary embodiment of a system 10 which combines an organic Rankine cycle with an engine (e.g., a diesel engine) to recover waste heat from the engine and convert the heat energy into motive work or to apply or transfer the energy in some other manner. The system 10 generally includes a boiler (or super-heater) 12, an energy conversion device (e.g., an expander such as a turbine, heat exchanger, etc.) 14 that may be connected to a load (e.g., a generator), a condenser 16, a pump 18, a recuperator 22, and a controller 63, which collectively constitute an RC subsystem.

As is further described below, a working fluid (such as Genetron™ R-245fa from Honeywell, Therminol™, Dowtherm J from the Dow Chemical Co., Fluorinol, Toluene, dodecane, isododecane, methylundecane, neopentane, neopentane, octane, water/methanol mixtures, or steam, for example) is passed through system 10 through a series of conduits. Conduit 24 is connected between an outlet 26 of condenser 16 and an inlet 28 of pump 18. Conduit 30 is connected between an outlet 32 of pump 18 and an inlet 36 of recuperator 22. Conduit 38 is connected between an outlet 40 of recuperator 22 and an inlet 44 of boiler 12. Conduit 46 is connected between an outlet 48 of boiler 12 and an inlet 50 of the energy conversion device 14. Conduit 52 is connected between a waste heat source 54 and an inlet 56 of boiler 12. Waste heat source 54 may be any acceptable source of waste heat such as EGR gas, charge air, engine coolant, or engine exhaust. Conduit 58 is connected between an outlet 60 of boiler 12. Depending upon the nature of waste heat source 54, the waste heat exiting boiler 12 through conduit 58 may be delivered, for example, to the engine's EGR loop, the vehicle exhaust system, the charge air loop, or the engine coolant loop.

Conduit 62 is connected between a outlet 64 of energy conversion device 14 (e.g., a diffuser outlet) and an inlet 66 of recuperator 22. Conduit 68 is connected between an outlet 70 of recuperator 22 and an inlet 72 of condenser 16. Conduit 74 is connected between a low temperature source 76 and an inlet 78 of condenser 16. Low temperature source 76 may be, for example, engine coolant, a low temperature coolant loop, and/or ambient air. Finally, conduit 80 is connected between an outlet 82 of condenser 16 and, depending upon the application, the engine cooling loop, a radiator, or the atmosphere.

In system 10, boiler 12 is provided to use heat from waste heat source 54 which is passed through boiler 12 to increase the temperature of a working fluid provided to boiler 12 at high pressure. As is further described below, under certain operating conditions, the working fluid is provided to boiler 12 at inlet 44 from recuperator 22 through conduit 38. When the working fluid leaves boiler 12 at outlet 48, it is in a gaseous state, at high pressure and high temperature as a result of the heat transferred to the working fluid from waste heat source 54 passed through boiler 12. This gas is passed through conduit 46 to energy conversion device 14 where the energy from the gas can be used to produce work using techniques that are well understood in the art. For example, energy conversion device 14 can be a turbine that causes rotation of a shaft (not shown) to drive a generator (not shown) for creating electrical power or to drive some other mechanical element to produce mechanical and/or electric power. The additional converted energy can be transferred to the engine crankshaft mechanically or electrically, or used to power parasitics and/or storage batteries. Alternatively, the energy conversion device can be used to transfer energy from system 10 to another system (e.g., to transfer heat energy from system 10 to a fluid for a heating system).

The energy conversion device 14 does not convert all of the heat energy from the working fluid into work. Thus, the working fluid discharged from energy conversion device 14 at outlet 64 remains in a high temperature, gaseous state (for some working fluids). As is further described below, the working fluid is passed through conduit 62 to recuperator 22 where, under certain operating conditions, it is used to transfer heat to the working fluid discharged from the condenser 16. The working fluid then passes through conduit 68 to condenser 16, where it is cooled by low temperature source 76 coupled to condenser 16. The working fluid discharged from condenser 16 though conduit 24 is in a low temperature, low pressure liquid state. As should be understood by those skilled in the art, condenser 16 is used to decrease the temperature of the working fluid for at least two reasons. First, although high temperature working fluid is desirable to obtain maximum work from energy conversion device 14 (i.e., to obtain maximum efficiency of the Rankine cycle), the primary requirement of system 10 is to maintain the desired heat rejection from waste heat source 54 passed through boiler 12. Accordingly, a low temperature working fluid should be provided to boiler 12. Second, increasing the pressure of the working fluid in its liquid state takes substantially less energy than increasing its pressure when in the gaseous state. As such, pump 18, which provides this pressure increase, may be less robust and less expensive than would otherwise be required for a gas pump.

The working fluid at outlet 32 of pump 18 is provided through conduit 30 to inlet 36 of recuperator 22 and inlet 34 of bypass valve 20. As will be further described below, under high load engine operating conditions, bypass valve 20, which is controlled by controller 63, is moved to an opened position, passing at least some of the low temperature working fluid directly to boiler 12. Under partial load engine operating conditions, which constitute the normal engine operating conditions, bypass valve 20 is moved to a closed position, thereby permitting the low temperature working fluid to flow through conduit 30 to recuperator 22. As described above, recuperator 22 provides heat transfer from the high temperature discharge gas from turbine 14 to the low temperature liquid provided by pump 18. This heat transfer increases the temperature of the working fluid (which remains in a liquid state) provided to boiler 12. Of course, higher temperature working fluid does not cool the waste heat streams passing through boiler 12 as effectively as cooler working fluid, but under most operating conditions, the heat rejection provided by the higher temperature working fluid is satisfactory. Moreover, because the working fluid enters boiler 12 at an elevated temperature, the working fluid provided from boiler 12 to turbine 14 (in a gaseous state) is at a higher energy state than it would otherwise be had recuperator 22 not been used. This provides greater energy to turbine 14, which consequently can generate a greater work output.

As indicated above, system 10 should be designed to operate over a wide range of conditions. For purposes of system 10, the operating conditions are primarily reflected by the temperature and pressure of waste heat provided to boiler 12. When waste heat source 54 is part of an EGR loop, the waste heat discharge 58 must not be permitted to exceed a maximum threshold temperature. In some applications, the outlet temperature of the waste heat flowing through conduit 58 from boiler 12 must be low enough to enable the engine to meet emission requirements imposed on the engine. If the required engine waste heat stream cooling is not met (if it is charge air, engine coolant or EGR gases) the engine will be non-compliant with emission regulations. If the waste heat stream is exhaust gas, this is not an issue because exhaust gas that is expelled out the exhaust stack is not required to be cooled.

Further, the inventors have recognized that at least a portion of the required charge cooling to meet a target emissions value, for example, a government mandated value, can be accomplished using the system 10. This is accomplished by transferring heat from the charge air and/or EGR to a high pressure working fluid in the RC subsystem in accordance with a control scheme carried out by the controller 63. The controller 63 can be an engine control module (ECM), also called an engine control unit (ECU), or another controller separate from the ECU, or one or more distributed control devices communicating with an ECM/ECU. The controller can include software and/or hardware for determining a maximum threshold temperature waste heat of EGR and/or charge air flowing through the conduit 58 to the intake manifold of the engine (not shown), and include other modules for controlling at least one parameter of the operation of system 10 to ensure the engine is operating within a required maximum emission level.

For example, FIG. 1 shows plural controller signal lines 90-98, each of which can carry sensing and/or control signals. In an embodiment, the controller can receive a signal provided by a sensor provided at conduits 52 and/or 58. The sensor can be a temperature (T) sensor or a combination of a T sensor and a pressure (P) sensor thereof (e.g., delta T or P sensors) to create a signal on lines 90 and/or 92 indicative of the temperature and/or temperature/pressure combination of waste heat flowing in these conduits, and the controller receives this information from signal lines 90 and/or 92 and determines which parameter(s) of the Rankine subsystem to adjust to bring the temperature of the waste heat flow, for example, the temperature of the input charge (EGR gas and/or charge air) exiting the boiler/superheater 12 below a maximum threshold temperature needed to maintain emissions at or below a required or desired maximum level. Determination of a maximum temperature (and/or pressure) for maintaining emissions at or below a required or desired emission level can involve using an algorithm, accessing a look-up table, a map or some other known way of determining a maximum input charge temperature value. Additionally, the maximum threshold temperature for waste heat of EGR and/or charge air can vary based on the current operation mode or a predicted operation mode of the engine. The controller can provide adjustments to the operation of the system 10, such causing a portion of all of the waste heat to bypass one or more of the components of the system 10. For example, as described below in detail, a signal line 98 can provide a control signal to the recuperator 22 or system elements (not shown in FIG. 1) that are associated waste heat flow through the recuperator. Additional controls can include controlling a parameter of the Rankine cycle subsystem to control an amount or rate of cooling performed by the low temperature source 76 via controller signal line 94 and controlling pump 18 via controller signal line 96, for example, via modulating the pump speed or restricting fluid flow at the pump 18 or at another point along the RC cycle loop. Also, the controller signal lines 90-98 can provide the controller 63 with information (e.g., in real-time) related to the health of the various system components.

Under ordinary engine load conditions, the low temperature working fluid from condenser 16 provides more than enough cooling to the waste heat passed through boiler 12. Accordingly, under normal load conditions, the working fluid is passed through recuperator 22, which both reduces the temperature of the working fluid provided to condenser 16 and increases the temperature of the working fluid provided to boiler 12. More specifically, as gaseous working fluid passes through a first flow path of recuperator 22 from inlet 66 to outlet 70, it transfers heat to the lower temperature liquid working fluid passing though a second flow path from inlet 36 to outlet 40. As a result, the gaseous working fluid provided to condenser 16 is cooler, and easier for condenser 16 to condense to liquid. Also, the liquid working fluid provided to boiler 12 is at a higher temperature. Consequently, the gaseous working fluid provided to energy conversion device 14 after heating in boiler 12 is at a higher energy state than it would otherwise be if recuperator 22 were not in the cycle. While less heat is removed from the waste heat, under normal load conditions, the waste heat temperature can be maintained below a maximum threshold for meeting the required emissions. Thus, system 10 can accommodate the added heat provided by recuperator 22 and realize greater efficiency because the added heat permits the energy conversion device 14 to create more useful work or to transfer greater amount of energy.

As an engine load increases (e.g., during acceleration, uphill driving, when pulling a heavy load, etc.), more, higher temperature waste heat is provided to boiler 12. As described above, in engine systems where waste heat source 54 is in an EGR loop and/or a charge air loop, for example, boiler 12 must extract enough heat from the waste heat to ensure that it remains below the maximum threshold temperature to ensure operation at or below predetermined emissions target value. As such, system 10 is designed to sense the increased load conditions and correspondingly activate controls to adjust the waste heat flow temperature via the controller 26. As described above, controls can be activated based on a target temperature that corresponds to a target emissions level, and the target temperature can have a value that is different for different operating modes and/or loads.

Figure 2:
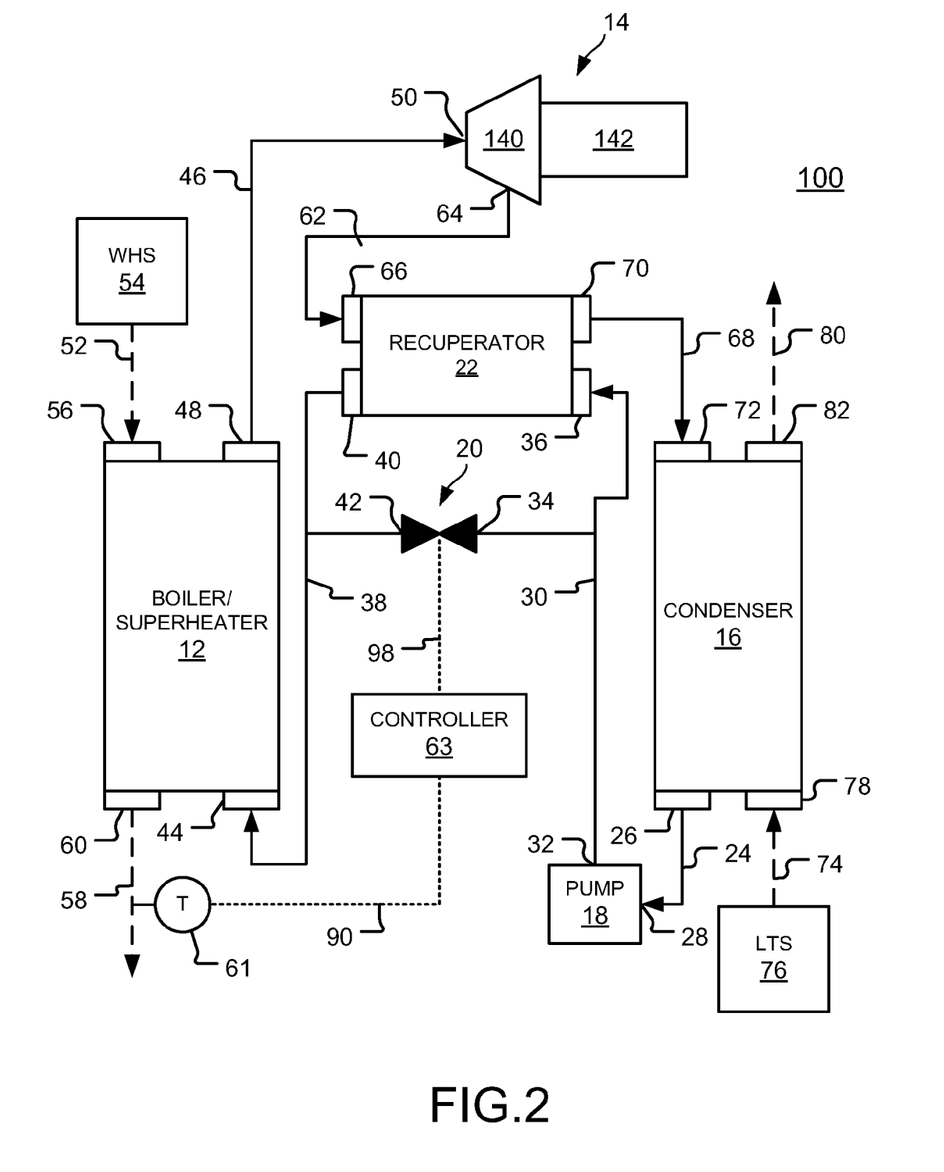
FIG. 2 is a diagram of a waste recovery system including a Rankine cycle and recuperator bypass according to an exemplary embodiment.

FIG. 2 is a diagram of a system 100 according to an exemplary embodiment in which charge air and/or EGR is cooled to meet a target emission level using a working fluid of an RC (e.g., an ORC), and the working fluid is controlled to bypass the recuperator under various engine load conditions. In this embodiment, the energy conversion device includes a combination of an expander (turbine) 140 and generator 142. Description of elements of FIG. 2, and in FIGS. 3 and 4 described hereafter, having the same reference numbers as in FIG. 1 is given above.

As shown in FIG. 2, conduit 30 is connected between an outlet 32 of pump 18, an inlet 34 of bypass valve 20, and an inlet 36 of recuperator 22. Conduit 38 is connected between an outlet 40 of recuperator 22, an outlet 42 of bypass valve 20, and an inlet 44 of boiler 12. A temperature sensor 61 is coupled to conduit 58 to detect the temperature of the waste heat exiting boiler 12, and provide an output signal on signal line 90 to controller 63 which provides a signal on signal line 98 that controls the position of bypass valve 20.

With an increase in engine load, a higher temperature waste heat is provided to boiler/superheater 12. As described above, in engine systems where waste heat source 54 is in an EGR loop and/or a charge air loop, for example, boiler 12 must extract enough heat from the waste heat to ensure that it remains below a maximum threshold temperature for that load such that operation at or below predetermined emissions target value is ensured. System 100 senses the increased load conditions and correspondingly activates bypass valve 20, if required, to direct working fluid directly from condenser 16 (though pump 18) to boiler 12. In the depicted embodiment of FIG. 2, sensor 61 senses the waste heat temperature flowing though conduit 58. In an embodiment, sensor 61 can provide an output signal indicative of the temperature of this waste heat to controller 63. Controller 63 includes electronics (not shown) which can interpret the output signals from sensor 61 to determine the engine load level. When the load level reaches a predetermined level, as indicated by sensor 61, controller 63 causes bypass valve 20 to open partially, thereby directing some of the cooler working fluid flowing though conduit 30 directly from pump 18 to boiler 12. As the engine load increases, controller 63 can further open bypass valve 20 to direct more cooler working fluid directly to boiler 12 (i.e., bypassing recuperator 22). The system 100 can be designed such that when bypass valve 20 is fully opened, enough cooler working fluid is provided to boiler 12 to prevent the waste heat exiting boiler 12 from exceeding a predetermined maximum temperature.

It is to be understood that other control systems may be employed to sense or determine engine load and correspondingly control bypass valve 20. For example, one skilled in the art can readily envision a predictive control system wherein engine load is monitored more directly, and bypass valve 20 is adjusted based on the expected temperature of the waste heat stream exiting boiler 12. In this configuration, the system anticipates the thermal lag experienced in the heat exchangers resulting from changes in engine operating conditions.

As a result of the bypassing described above, under increasing load conditions at least a portion of the working fluid is not passed through recuperator 22 where its temperature would be elevated prior to entering boiler 12. The working fluid flow rate is reduced compared to what the flowrate would have been without the recuperator bypass valve in the system under these conditions because the heat input from recuperator 22 is removed. Higher temperature gases discharged from turbine 140 are then cooled by condenser 16. This results in higher pressure at condenser 16, a lower pressure ratio at turbine 140, and a correspondingly lower power output of turbine 140. In other words, the efficiency of system 100 is reduced because the condenser 16 must cool the working fluid discharged from turbine 140 without the benefit of recuperator 22 cooling the working fluid, and because the working fluid provided turbine 140 from boiler 12 is not pre-heated by recuperator 22. As the high load conditions occur for only a relatively small percentage of the engine's operating time (e.g., five to ten percent), this loss in efficiency can be acceptable.

As should be apparent from the foregoing, system 10 may be designed for efficient operation at the most common operating point (i.e., normal engine load conditions) as the recuperator 22 bypass feature permits system 10 to accommodate the peak heat rejection requirements that occur under high load conditions. As such, a lower power turbine 140 may be selected. More specifically, if bypass valve 20 were not included in system 10, turbine 14 would be required to withstand the high load operating conditions described above, even though those high load conditions occur relatively infrequently. This would require a more robust, more expensive turbine 140 (e.g., a maximum output of 35 KW), which would be essentially under-utilized most of the time (i.e., under normal load conditions). By implementing the bypass feature described above, a less robust, less expensive turbine 140 may be used (e.g., a maximum output of 25 KW).

Additionally, by placing bypass valve 20 at the output of pump 18 rather than on the high temperature side of system 100, bypass valve 20 may be designed for operation with a lower temperature liquid rather than a high temperature gas. Accordingly, bypass valve 20 may be more compact, simpler, and less expensive than would otherwise be required. Moreover, the flow rate and power of pump 18 may be lower than would otherwise be required.

Figure 3:
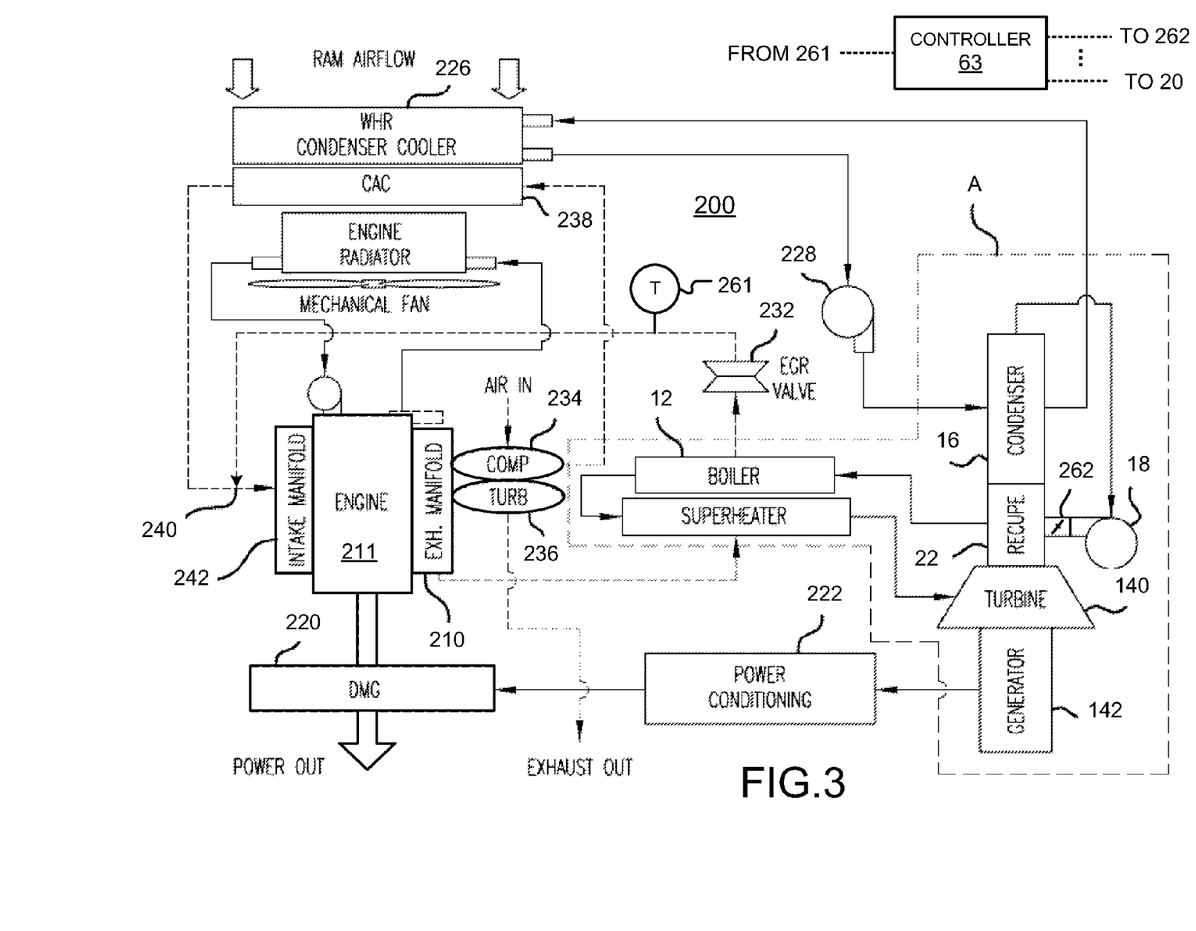
FIG. 3 is a diagram of a waste recovery system including a Rankine cycle for cooling at least EGR gas according to an exemplary embodiment.

FIG. 3 shows an exemplary ORC cooling system 200 according to an embodiment in which only EGR gases are cooled using an ORC subsystem system A, where charge cooling by subsystem A is required to meet a target emission level, which can be a predetermined current allowable or a desired engine emission level.

As shown in FIG. 3, ORC subsystem A transfers thermal energy of the EGR gases exiting the exhaust manifold 210 of an engine 211 to the working fluid of subsystem A. More specifically, the ORC subsystem A includes a feed pump 18 that moves high pressure liquid working fluid to an inlet of a boiler of a boiler/superheater 12, where heat from EGR charge gases is transferred to the ORC working fluid. In the boiler/superheater 12, the working fluid boils off and produces a high pressure vapor that exits the boiler/superheater 14 at the superheater and enters an inlet of a high pressure expander (turbine) 140.

The ORC cooling system 200 is capable of producing additional work output from the high pressure turbine 140. For example, the additional work can be fed into the engine's driveline either mechanically or electrically, or it can be used to power electrical devices, parasitics or a storage battery. In the embodiment shown in FIG. 3, the expanding vapor turns the turbine 140, which turns an electrical generator 142. The power generated by the generator 142 can be feed into a driveline motor generator (DMG) 220 via power electronics 222. The expanded gases exit the outlet of the turbine 16 and are then cooled and condensed via a condenser 16, which can be cooled by a LTS, which in this case is a liquid loop including a condenser cooler 226 having RAM airflow and condenser cooler pump 228, although other condenser cooling schemes can be employed such as a direct air-cooled heat exchanger. The condensed working fluid exits the outlet of the condenser 16 and is supplied to the feed pump 18 to complete the cycle and increase the working fluid pressure. Although not shown, a boost pump also can be provided to prevent feed pump 18 from cavitating.

FIG. 3 shows that the ORC subsystem A includes a recuperator 22 in the working fluid path from the turbine 140 to the condenser 16 and in the path from the feed pump 18 to the boiler of the boiler/superheater 12 to increase thermal efficiency of the RC. As described above, the recuperator 22 is a heat exchanger in which includes two paths. The working fluid moves along a first of these paths after exiting the outlet (not shown) of the turbine 140 before proceeding to the condenser 16. While in the first path, the recuperator 22 reduces the temperature of the working fluid before the fluid enters condenser 16. After traversing the condenser 16, the working fluid is moved by the feed pump 18 in a second path through the recuperator 22. Along the second path, heat is transferred back from the recuperator 22 into the now lower temperature working fluid before being provided to the boiler/superheater 12. Although not shown in FIG. 3, EGR gases leaving the ORC subsystem A can require additional cooling using traditional cooling systems, for example, using a low temperature liquid cooling loop or direct cooling with air.

The EGR charge can be combined with charge air that has been compressed by a compressor 234 coupled to and driven by a turbine 236 powered by exhaust gases exiting the exhaust manifold 210. The charge air is heated when compressed by the compressor 234. The heated charge air is provided to a charge air cooler (CAC) 238, where it is cooled before being combined with the cooled EGR gas at a mixer 240. The combined charge mixture including the cooled EGR gas and the cooled and compressed charge air is provided to the intake manifold 242 of the engine 211. The amount of EGR charge gas flow can be controlled by an EGR valve 232.

The system 200 also includes a sensor 261 coupled to the EGR gas flow upstream from the boiler/superheater 12 for sensing the temperature of the EGR gas, as described above with respect to FIG. 1. While sensor 261 is shown positioned upstream of the EGR valve 232, sensor 261 can be provided anywhere upstream of the boiler. Also, while not shown in FIG. 3, the recuperator 22 can include a bypass valve 20 as shown in the system 10 of FIG. 2. Another temperature controlling mechanism shown in system 200 is a flow restrictor 262 that is controllable by controller 63 to regulate a rate of flow of the working fluid in the ORC subsystem A. The system 200 can include only one control or plural controls for adjusting the temperature of waste heat flow (EGR) exiting the ORC subsystem A. When employing plural control mechanisms, each may be used alone at times, or in conjunction with any combination of other control mechanisms at other times to achieve a desired cooling speed and volume of gas for cooling.

Figure 4:
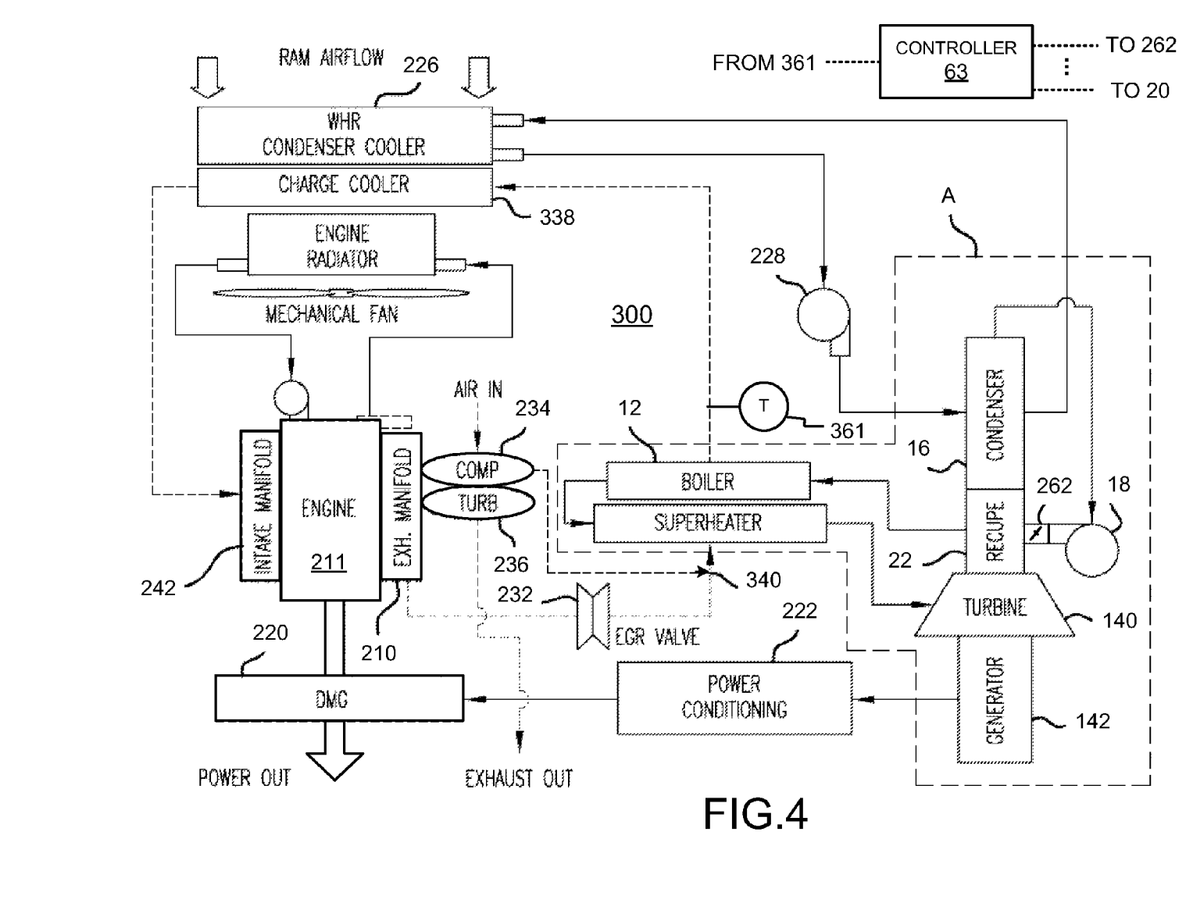
FIG. 4 is a diagram of a waste recovery system including a Rankine cycle for cooling an EGR gas and charge air mixture according to an exemplary embodiment.

FIG. 4 shows an ORC charge cooling system 300 according to an embodiment in which the ORC subsystem A cools both the EGR gases and charge air in a combined charge cooler. Items having the same reference number as items in any of systems 10, 100 and 200, are described above.

As shown in FIG. 4, the air charge discharged from the compressor 234 is mixed at a mixer 340 with the EGR gases from the EGR valve 232 and the charge mixture is passed through the ORC heat exchanger (i.e., the boiler/superheater 12) for heat transfer to the ORC. The cooled gas mixture is provided to an inlet of the charge cooler 338 (e.g., CCAC) to be further cooled, and the cooled mixture exiting the outlet of the charge cooler 338 is provided to the intake manifold 242 of the engine 211.

Other embodiments can include variations of heat input from charge gases. These include the use of a charge air only heat input system. Another variation is the use of charge air and EGR cooling where the gases remain unmixed, the charge air and EGR heat inputs to the ORC could be in a parallel or series heat input configuration. Also, the charge cooler can be excluded entirely or a bypass valve provided therein to allow for additional temperature control.

Additionally, other heat sources related to engine cooling can be included in an embodiment of a charge cooling system utilizing an RC and energy conversion device to increase the power recovery, including jacket water, oil cooling or exhaust gas cooling.

Although a limited number of embodiments is described herein, one of ordinary skill in the art will readily recognize that there could be variations to any of these embodiments and those variations would be within the scope of the disclosure.

What is claimed is:

1. A method of cooling input charge flow, which includes at least one of an exhaust gas recirculation (EGR) source and a charge air source, upstream of an intake internal combustion engine, comprising:
   providing the input charge flow to a boiler a Rankine power cycle subsystem to transfer heat from the input charge to a working fluid of the Rankine power cycle subsystem and vaporize the working fluid;
   converting the energy of the transferred heat;
   condensing the working fluid from which the energy was converted;
   pumping the condensed working fluid to move the working fluid though the Rankine power cycle;
   determining a target temperature of the input charge sufficient to meet or exceed predetermined target emissions;
   sensing the temperature of the input charge flow exiting the boiler; and
   controlling at least one parameter of the Rankine power cycle to maintain temperature of the input charge at or below the target temperature corresponding to said predetermined target emissions having been met or exceeded.

2. A system including a Rankine power cycle subsystem providing emissions-critical charge cooling of an input charge flow, which includes at least one of an exhaust gas recirculation (EGR) source and a charge air source, upstream of an intake internal combustion engine, comprising:
   a boiler fluidly coupled to the input charge flow and transferring heat from the input charge flow to a working fluid of the Rankine power cycle subsystem and vaporize the working fluid;
   an energy conversion device fluidly coupled to the boiler and receiving vaporized working fluid and convert the energy of the transferred heat;
   a condenser fluidly coupled to the energy conversion device and receiving the working fluid from which the energy was converted;
   a pump having an inlet fluidly coupled to an outlet of the condenser and an outlet fluidly coupled to an inlet of the boiler, said pump pumping fluid from the condenser to the boiler;
   means for adjusting at least one parameter of the Rankine power cycle subsystem to change a temperature of the input charge flow exiting the boiler;
   a sensor sensing a temperature characteristic of the input charge flow; and
   a controller determining a target temperature of the input charge flow sufficient to meet or exceed predetermined target emissions and to cause said means for adjusting said at least one parameter of the Rankine power cycle to achieve the predetermined target emissions.

3. The system according to claim 2, further comprising a mixing chamber fluidly coupled to said boiler and upstream from the boiler, wherein the input charge flow includes both charge exhaust gas recirculation (EGR) source and a charge air source mixed in the mixing chamber.

4. The system according to claim 2, wherein the energy conversion device is a turbine.

5. The system according to claim 4, further comprising an electric generator coupled to the turbine.

6. The system according to claim 2, wherein the means for adjusting comprises a recuperator bypass valve.

7. The system according to claim 2, wherein the means for adjusting at least one parameter of the Rankine power cycle subsystem comprises a flow restrictor in the flow path of the working fluid.

8. The system according to claim 2, wherein the means for adjusting at least one parameter of the Rankine power cycle subsystem comprises a variable speed controller in the pump.

9. An internal combustion engine including a Rankine power cycle cooling subsystem providing emissions-critical charge cooling of an input charge flow, which includes at least one of an exhaust gas recirculation (EGR) source and a charge air source, upstream of an intake of the internal combustion engine, comprising:
- a boiler fluidly coupled to the input charge flow and transferring heat from the input charge to a working fluid of the Rankine power cycle subsystem and vaporize the working fluid;
- an energy conversion device fluidly coupled to the boiler and receiving vaporized working fluid and convert the energy of the transferred heat;
- a condenser fluidly coupled to the energy conversion device and receiving the working fluid from which the energy was converted;
- a pump having an inlet fluidly coupled to an outlet of the condenser and an outlet fluidly coupled to an inlet of the boiler, said pump pumping fluid from the condenser to the boiler;
- an adjuster adjusting at least one parameter of the Rankine power cycle subsystem to change a temperature of the input charge flow exiting the boiler;
- a sensor sensing a temperature characteristic of the input charge flow; and
- a controller determining a threshold temperature of the input charge flow, below which is sufficient to meet or exceed a predetermined target emissions and to cause said adjuster to adjust said at least one parameter of the Rankine power cycle to maintain the sensed temperature within the determined threshold temperature.

10. The internal combustion engine according to claim 9, further comprising a mixing chamber fluidly coupled to said boiler and upstream from the boiler, wherein the input charge flow includes both charge exhaust gas recirculation (EGR) source and a charge air source mixed in the mixing chamber.

11. The internal combustion engine according to claim 9, wherein the energy conversion device is a turbine.

12. The internal combustion engine according to claim 11, further comprising an electric generator coupled to the turbine.

13. The internal combustion engine according to claim 9, wherein the adjuster to adjust said at least one parameter of the Rankine power cycle comprises a recuperator bypass valve.

14. The internal combustion engine according to claim 9, wherein the adjuster to adjust said at least one parameter of the Rankine power cycle comprises a flow restrictor in the flow path of the working fluid.

15. The internal combustion engine according to claim 9, wherein the adjuster to adjust said at least one parameter of the Rankine power cycle comprises a variable speed controller in the pump.

* * * * *